Patented Nov. 26, 1929

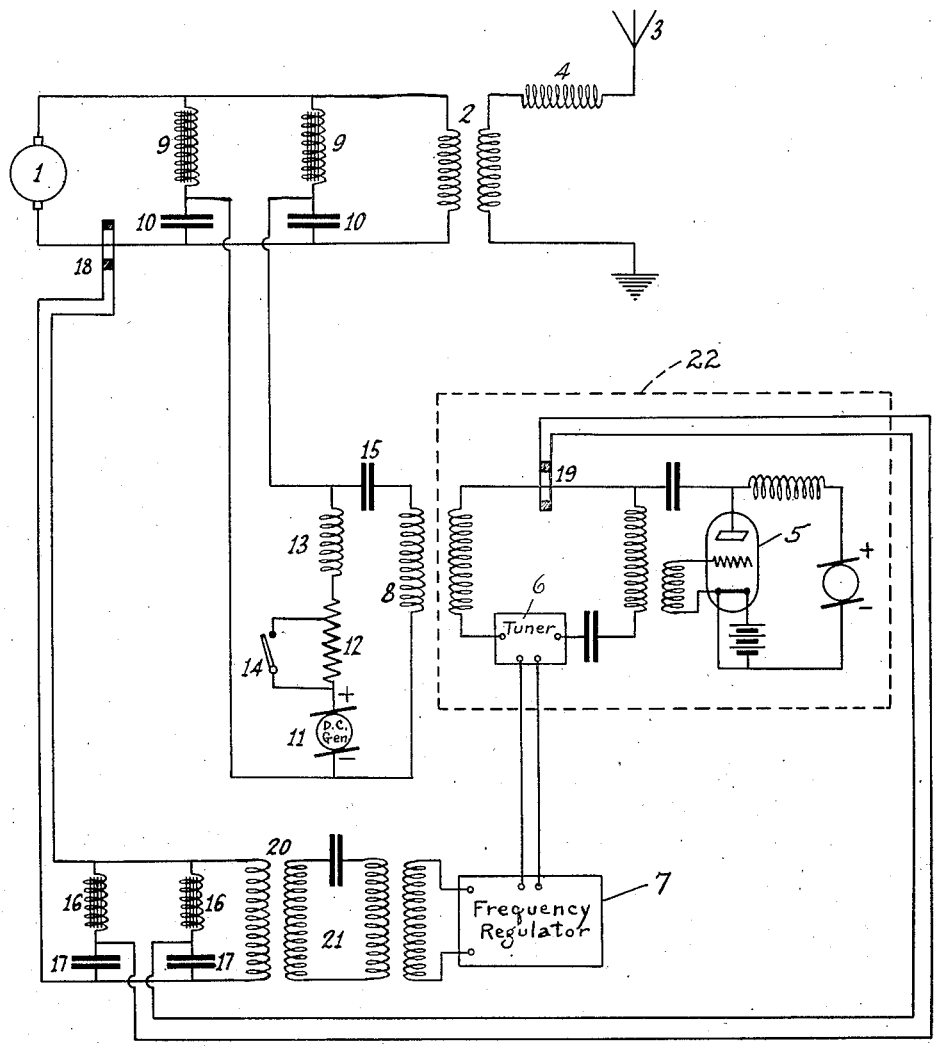

1,737,147

UNITED STATES PATENT OFFICE

HENRI CHIREIX, OF PARIS, FRANCE

FREQUENCY REGULATION

Application filed November 10, 1924, Serial No. 748,884, and in France December 13, 1923.

The present invention has as its special object to improve the constancy of the frequency of radio-telephony transmission waves in general, more particularly those produced by the aid of alternators.

All of these alternators producing high frequency oscillations constructed commercially up to the present time generate currents having a frequency directly proportional to their speed of rotation, and the problem of the regulation and control of the frequency is substantially reduced to a problem of regulating the speed of the machine.

One may thus have recourse to speed regulators properly so-called (mechanical regulators based upon the action of centrifugal force, for example), or to regulators of the frequency properly so called (electric regulators of the type disclosed in and forming the subject-matter of French Patent No. 560,172).

The inconvenience and trouble attendant upon these devices, while being very perfect in themselves, is that they act upon the high frequency machine itself which often has a power of several hundred kw. By reason of the great inertia (both mechanical and electrical) the regulation is slow and frequently it happens that the entire system begins to hunt, as a consequence of the electro-mechanical reactions between motor and generator. Now, the present invention remedies this inconvenience by that the regulator is brought to act upon an element of considerably smaller dimensions.

The principle underlying the invention may be set forth as follows: One modulates the high frequency current generated by the high frequency alternator to a by far lower frequency. This modulation can be accomplished either by the aid of a magnetic modulator, for instance, in conformity with French Patent No. 553,932, or by the aid of a mechanically variable reluctance by means of a small driving motor; thereupon one separates the two frequencies into which the modulated wave may be resolved by tuning the aerial to one of them. For instance, if the alternator available is of 20000 periods, one may modulate the same for instance, at a frequency of 500 periods by sending current of this frequency into the modulator, the aerial being tuned, according to desires, to 19500 or to 20500 periods. In virtue of the selective properties of the aerial, this can be easily done, the wave to which the aerial is not tuned giving rise to only an inappreciable expenditure of energy.

If one then uses, by means of convenient coupling means, energy of a frequency of 20500 periods for supplying the electrical frequency regulator, and if the latter is made to act upon the generator producing current of 500 periods, supplying the magnetic modulator in such a manner that the action of the magnetic regulator modifies the frequency of the current of 500 periods, it can be seen what the result of this will be. If the frequency delivered by the alternator (which pro tem we will suppose as not being provided with a speed regulator) drops to 19990 periods, the wave sent into the antenna drops to 20490 periods; then the frequency regulator begins to act and causes a change in the frequency of the generator producing 500 periods; this action only ceases upon the latter furnishing a current of 510 periods. It will be noted, therefore, that the variations in the frequency of the alternator is corrected by means of variations in frequency of opposite sign impressed upon the modulator.

In a case in which the modulation is obtained by means of a variable inductance driven by a motor, the electric frequency regulator is preferably made to act upon an element controlling the speed of this motor. In case a magnetic modulator is employed, it is more desirable to proceed in a different manner, for instance, in the following way: The magnetic modulator is saturated by means of a small valve outfit or other source of alternating current giving a current of the requisite frequency, and the electric regulator is made to act, e. g., upon a variometer whereby the frequency of the local waves produced by the said small outfit is changed. The valve outfit that is required, has a power of only a few hundredths of that of the main equipment, and the frequency sent out can rapidly be changed by the aid of an element involving very little inertia.

We have so far assumed that the alternator was not equipped with a speed controller, but it is evident that it is desirable to provide for such regulation of the speed, the frequency regulator being merely an auxiliary means.

It must be noted that, in this system, the sending is entirely as "pure" as with an ordinary alternator, and that it is necessary to employ the heterodyne method in reception, or any other method allowing of the reception of continuous waves.

The invention is particularly important and suited in cases in which alternators in conjunction with frequency raising means are used. In fact, in all cases in which it is desired to obtain even multiples of the original frequency, it is generally necessary to saturate the frequency raisers by means of direct current generally supplied in the form of currents of large intensity and low voltage. This can be avoided by saturating the frequency raisers directly by the modulation current furnished preferably from the small valve outfit above referred to. Even in a case in which there is no need for direct current for saturation purposes (even multiples of the fundamental frequency) this process could be utilized, the addition of a modulation current to effectively modulate the transmission.

It must be well understood that, although in what precedes only the sending by alternators has been discussed, the method is applicable irrespective of what the nature of the main generator may be (arc, valve outfit), and the appended claims should therefore be construed in the same light, namely, that the said alternator or generator may be any source of high frequency currents whatever.

By means of this invention it becomes possible to drive the high frequency alternators by means of synchronous motors driven directly from a supply line.

The single figure of the accompanying drawing shows by way of example an arrangement embodying the idea underlying the invention. In the same, 1 is the main alternator furnishing current having a frequency F and supplying through the intermediary of a Tesla coil 2 the antenna 3 tuned by means of inductance coil 4 to the frequency $(F+f)$ or $(F-f)$ as described; device 22 shown enclosed by the dotted rectangle and comprising an oscillation generator circuit including valve 5 is adapted for normally furnishing a modulating frequency $f$.

The said outfit 22 is arranged in conformity with any of the devices known in the art; the frequency of its generated oscillations may be varied by means of the variometer 6 actuated in any well known manner by the frequency regulator 7. One such device is shown in the patent to Round, No. 1,642,173 issued Sept. 13, 1927.

The valve 5 is connected by means of coupling 8 with saturation circuit of modulators 9, 9. These modulators are mounted preferably in series with condensers 10, 10, across the terminals of the alternator. The reactance of circuits 9, 10, is regulated in a manner so as to be neutralized twice in each period of $f$ when the current furnished by the valve 5 attains its maximum value. Numeral 11 represents a direct current generator in series with resistance 12 and an inductance coil (choker) 13 allowing of the controlling of the waves sent out by the aid of a relay 14 connected in shunt with part of the resistance 12. The condenser 15 prevents the passage of the direct current into branch 8, while inductance coil 13 prevents the flow of current of frequency $f$ into the dynamo. It will be seen that when sending a convenient direct current into the modulators 9, it is also possible to reduce to zero the reactance of the circuits 9 and 10, and as a consequence the alternator is caused to be short-circuited at the cadence of rhythm of the signals to be sent out. When the key is raised, the current furnished by the machine 11 is sufficiently small and the alternating current of frequency $f$ produced by the generator 5 modulates the oscillations produced by the alternator.

A second pair of modulators of very low power 16, 17, 16, 17 insures the supply with current of frequency $F+f$ of the frequency regulator. As a matter of fact, it will be seen that the currents induced in the windings 18 and 19 respectively passed by the currents of frequency F and $f$ become superimposed in the inductance coils 16; as a consequence, there arises in the circuit 21 tuned to the frequency $(F+f)$ a current of this frequency, and only of this frequency, by making the circuit of sufficiently low damping in order that it may not absorb energy of the frequency $(F-f)$. The circuit 21 is supplied upon the whole in the same manner as the aerial 3, but the power which is brought to act in this circuit and in the modulators 16, 17, is only what is required for the operation of the regulator 7.

This regulator itself is built in conformity with the one disclosed in detail in French Patent No. 560,172 taken out by the applicant. The operation is the same as hereinbefore described. If the speed of the alternator 1 varies and thereby results in changes in the frequency F, the supply frequency of the frequency regulator varies by the same amount, and as a consequence causes the latter to become operative. This regulator restores the correct frequency in the circuit 21, and as a consequence the correct frequency in the aerial by acting upon the frequency $f$ which will change by the same amount as the frequency F has changed, although in contrary sense, in order that the sum total of both frequencies may be maintained at a constant value.

In the case of frequency raisers, the circuits, in a general way, would be the same except that the current produced by the transmitter (generator or oscillations) would directly saturate the frequency raiser itself. It is finally quite obvious that a greater number of modifications of the scheme would be feasible without departing from the spirit of the invention. While I have described a single embodiment of my invention it will be apparent to one skilled in the art that my invention is not limited to the precise arrangement shown but that many modifications may be made in the circuit arrangements and apparatus used without departing from the scope of my invention as set forth in the appended claims.

Claims:

1. A circuit arrangement comprising an alternator, means for modulating the output thereof, a circuit tuned to one frequency component of the modulated output and means associated with the modulating means and with the alternator output for controlling the frequency of said modulating means to maintain the frequency component constant in spite of any variation in the alternator frequency.

2. A circuit arrangement comprising an alternator, means for modulating the output thereof, a circuit tuned to one frequency component of the modulated output and means rendered effective by variations in frequency of the alternator for controlling the frequency of the modulating means to maintain the frequency component constant.

3. A circuit arrangement comprising an alternator, means for modulating the output thereof, a circuit tuned to one frequency component of the modulated output and means rendered effective by variations in alternator frequency for changing the frequency of the modulating means inversely to a change in the alternator frequency to maintain the frequency component constant.

4. A circuit arrangement comprising a main alternator, means for modulating the output thereof comprising an auxiliary alternator with means for changing its frequency, a circuit tuned to one frequency component of the modulated output and means rendered effective by variations in the main alternator frequency cooperating with the auxiliary frequency changing means to maintain the frequency component of the modulated output constant.

5. A circuit arrangement comprising a main alternator, means for modulating the output thereof comprising an auxiliary alternator with means for changing its frequency, a tuned circuit for selecting one frequency component of the modulated output and means responsive to variations in the main alternator frequency for changing the frequency of the auxiliary alternator inversely to changes in the main alternator frequency to maintain the frequency of the selected component constant.

6. A circuit arrangement comprising a main alternator, means for modulating the output thereof comprising an auxiliary alternator with means for changing its frequency, a tuned circuit for selecting one frequency component of the modulated output, means for diverting a portion of the output energy of each alternator and means responsive to variations in frequency of the combined diverted portions of energy for operating the frequency changing means of the auxiliary alternator to maintain the frequency of the selected frequency component constant.

7. A circuit arrangement comprising a main alternator, means for modulating the output thereof comprising an oscillator having a variable impedance in one of its circuits for changing its frequency, a tuned circuit for selecting one frequency component of the modulated output and means responsive to the changes in main alternator frequency for varying said impedance, to control the oscillator frequency to maintain the frequency of the selected frequency component constant.

8. A circuit arrangement comprising a main alternator, means for modulating the output thereof comprising an oscillator having a variable impedance in one of its circuits for controlling its frequency, a tuned circuit for selecting one frequency component of the modulated output, means for diverting a portion of the output energy of said main alternator and said oscillator and means responsive to variations in frequency of the combined portions of the diverted energy for varying said impedance in response to a change in frequency of the main alternator to maintain the frequency of the selected frequency component constant.

9. A high frequency signalling system comprising a main alternator, means for modulating its output including a magnetic modulator and an auxiliary alternator for supplying energy to said modulator, a utilization circuit and means associated therewith for selecting a single frequency component of said modulated output, and means electrically associated with said main and auxiliary alternators for controlling the frequency of the modulating means whereby said frequency component is maintained substantially constant in spite of any variations in the main alternator frequency.

10. A high frequency signalling system comprising a main alternator, means for modulating its output including a magnetic modulator and an auxiliary alternator for supplying energy to said modulator, a utilization circuit and means associated therewith for selecting a single frequency component of said modulated output, and means electrically associated with said main and auxiliary alternators for controlling the frequency of the modulating means whereby said frequency component is maintained substantially constant in spite of any variations in the main alternator frequency, said last-mentioned means including a frequency regulator for varying the frequency of the modulating means in a sense opposite to variations in the main alternator frequency and a second modulating means fed from the main and auxiliary alternators coupled to said frequency regulator.

HENRI CHIREIX.